US008815167B2

(12) United States Patent
Shimoda et al.

(10) Patent No.: US 8,815,167 B2
(45) Date of Patent: Aug. 26, 2014

(54) ELECTRODE, ELECTRICALLY HEATING TYPE CATALYST DEVICE USING SAME, AND MANUFACTURING METHOD OF ELECTRICALLY HEATING TYPE CATALYST DEVICE

(75) Inventors: Kenji Shimoda, Nagoya (JP); Kazuaki Nishio, Nisshin (JP); Yasuo Kinoshita, Aichi-gun (JP); Tadashi Takagaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 151 days.

(21) Appl. No.: 13/577,368

(22) PCT Filed: Sep. 14, 2011

(86) PCT No.: PCT/JP2011/005195

§ 371 (c)(1), (2), (4) Date: Aug. 6, 2012

(87) PCT Pub. No.: WO2013/038449

PCT Pub. Date: Mar. 21, 2013

(65) Prior Publication Data

US 2013/0062328 A1 Mar. 14, 2013

(51) Int. Cl.
*B01D 50/00* (2006.01)

(52) U.S. Cl.
USPC .......................................................... 422/174

(58) Field of Classification Search
CPC ...... H05B 3/10; H05B 3/12; H05B 2203/024; F01N 3/2013; F01N 3/2026
USPC ............ 422/174, 171, 177; 219/201; 427/446
See application file for complete search history.

(56) References Cited

U.S. PATENT DOCUMENTS

| | | | | |
|---|---|---|---|---|
| 4,618,404 A * | 10/1986 | Pellegri | ......................... | 205/532 |
| 4,724,305 A * | 2/1988 | Iimura et al. | .................. | 219/469 |
| 6,109,018 A * | 8/2000 | Rostrup-Nielsen et al. | .... | 60/777 |

FOREIGN PATENT DOCUMENTS

| | | |
|---|---|---|
| JP | 6 219855 | 8/1994 |
| JP | 8 36337 | 2/1996 |
| JP | 8 203329 | 8/1996 |
| JP | 10 140318 | 5/1998 |
| JP | 11 60342 | 3/1999 |
| JP | 2006 21974 | 1/2006 |
| JP | 2011 106308 | 6/2011 |
| JP | 2011 132561 | 7/2011 |
| JP | 2012 57508 | 3/2012 |

OTHER PUBLICATIONS

International Search Report Issued Dec. 20, 2011 in PCT/JP11/005195 Filed Sep. 14, 2011.

* cited by examiner

*Primary Examiner* — Tom Duong
(74) *Attorney, Agent, or Firm* — Oblon, Spivak, McClelland, Maier & Neustadt, L.L.P.

(57) ABSTRACT

An electrode according to one aspect of the present invention is formed on a base material composed of a ceramics. The electrodes includes a matrix composed of an Ni—Cr alloy (with a Cr content of 20 to 60 wt. %) or an MCrAlY alloy (M is at least one material selected from Fe, Co and Ni), and a disperse phase that is dispersed in the matrix and composed of an oxide mineral having a laminated structure. The ratio of area occupied by the disperse phase in a cross section of the electrode is 40 to 80%. With the structure like this, it is possible to suppress the increase in the electrical resistance even after a thermal cycle is performed.

18 Claims, 10 Drawing Sheets

Fig. 15

| | MATRIX | AVERAGE PARTICLE DIAMETER (μM) | DISPERSE PHASE | AVERAGE PARTICLE DIAMETER (μM) | DISPERSE PHASE AREA RATIO [%] | THERMAL SPRAYING ATMOSPHERE | ELECTRICAL RESISTANCE AFTER EVALUATION [Ω] |
|---|---|---|---|---|---|---|---|
| EXAMPLE 1 | Ni-50Cr | 30 | BENTONITE | 30 | 40 | Ar SHIELD | 3.0 |
| EXAMPLE 2 | Ni-50Cr | 30 | BENTONITE | 30 | 60 | Ar SHIELD | 2.8 |
| EXAMPLE 3 | Ni-50Cr | 30 | BENTONITE | 30 | 80 | Ar SHIELD | 4.0 |
| EXAMPLE 4 | Ni-50Cr | 30 | MICA | 30 | 60 | Ar SHIELD | 3.1 |
| EXAMPLE 5 | Co-25Ni-16Cr -6.5Al-0.5Y | 30 | BENTONITE | 30 | 60 | Ar SHIELD | 3.5 |
| EXAMPLE 6 | Co-25Ni-16Cr -6.5Al-0.5Y | 30 | MICA | 30 | 60 | Ar SHIELD | 3.6 |
| EXAMPLE 7 | Ni-23Co-20Cr -8.5Al-0.6Y | 30 | BENTONITE | 30 | 60 | Ar SHIELD | 3.7 |
| EXAMPLE 8 | Fe-20Cr -6.5Al-0.5Y | 30 | BENTONITE | 30 | 60 | Ar SHIELD | 3.3 |
| EXAMPLE 9 | Ni-50Cr | 30 | BENTONITE | 30 | 40 | ATMOSPHERE | 20 |
| EXAMPLE 10 | Ni-50Cr | <5 | BENTONITE | 30 | 60 | ATMOSPHERE | 46 |
| COMPARATIVE EXAMPLE 1 | Ni-50Cr | <5 | GRAPHITE | 30 | 60 | ATMOSPHERE | 490 |
| COMPARATIVE EXAMPLE 2 | Ni-50Cr | 30 | GRAPHITE | 30 | 60 | ATMOSPHERE | 310 |
| COMPARATIVE EXAMPLE 3 | Ni-50Cr | 30 | GRAPHITE | 30 | 60 | Ar SHIELD | 200 |
| COMPARATIVE EXAMPLE 4 | Ni-50Cr | 30 | BENTONITE | 30 | 30 | ATMOSPHERE | PEELING |
| COMPARATIVE EXAMPLE 5 | Ni-50Cr | 30 | BENTONITE | 30 | 30 | Ar SHIELD | PEELING |

ELECTRODE, ELECTRICALLY HEATING TYPE CATALYST DEVICE USING SAME, AND MANUFACTURING METHOD OF ELECTRICALLY HEATING TYPE CATALYST DEVICE

TECHNICAL FIELD

The present invention relates to an electrode, an electrically heating type catalyst device using the electrode, and a manufacturing method of an electrically heating type catalyst device.

BACKGROUND ART

In recent years, EHCs (electrically heated catalysts) are attracting attention as an exhaust purification device that purifies exhaust gases discharged from engines of automobiles and the like. In EHCs, it is possible to forcibly activate a catalyst by electrical heating even under such conditions that the temperature of the exhaust gas is low and thus the catalyst cannot be easily activated, such as immediately after the engine is started, and thereby to enhance the purification efficiency of the exhaust gas.

An EHC disclosed in Patent literature 1 includes a cylindrical catalyst support having a honeycomb structure on which a catalyst such as platinum and palladium is supported, and a pair of electrodes that are electrically connected to the catalyst support and disposed opposite to each other on the outer surface of the catalyst support. In this EHC, the catalyst supported on the catalyst support is activated by electrically heating the catalyst support between the pair of electrodes. In this way, toxic substances such as unburned HC (hydrocarbon), CO (carbon monoxide), and NOx (nitrogen oxide) in an exhaust gas that passes through the catalyst support are removed by the catalytic reaction.

Since an EHC is disposed on a discharge path of an automobile or the like, the material for the above-described electrode needs to have, in addition to the electrical conductivity, heat resistance, acid resistance at a high temperature, corrosion resistance in an exhaust-gas atmosphere, and the like. Therefore, as mentioned in Patent literature 1, metallic material such as an Ni—Cr alloy and an MCrAlY alloy (M is at least one material selected from Fe, Co and Ni) is used. Meanwhile, as for the material for the above-described catalyst support, ceramic material such as SiC (silicon carbide) is used.

Since an EHC is disposed on the discharge path as described above, the above-described electrode and the catalyst support repeatedly expand and contract due to the thermal cycle (normal temperature to about 900° C.). It should be noted that there has been a problem that cracking and/or peeling occur in the electrode because of the difference between the linear expansion coefficient of the metallic material forming the electrode and that of the ceramic material forming the catalyst support. To cope with this problem, in Patent literature 2, the stress caused by the above-described linear expansion coefficient difference is alleviated by inserting a porous intermediate layer made of metallic material similar to that for the electrode between the electrode and the catalyst support.

CITATION LIST

Patent Literature

Patent literature 1: Japanese Unexamined Patent Application Publication No. 2011-106308

Patent literature 2: Japanese Unexamined Patent Application Publication No. 2011-132561

SUMMARY OF INVENTION

Technical Problem

The inventor has found the following problem to be solved.

The porous intermediate layer disclosed in Patent literature 2 contains graphite and/or polyester. That is, it contains carbon. The inventor has found out that, when the intermediate layer contains carbon, the electrical resistance of the electrode significantly increases after a thermal cycle is performed. It is surmised that this is caused because Cr, which gives the acid resistance, reacts with carbon in the intermediate layer and thereby produces a Cr carbide(s), thus accelerating the oxidation of the electrode.

The present invention has been made in view of the above-described circumstances, and an object thereof is to provide an electrode capable of minimizing the increase in the electrical resistance even after a thermal cycle is performed.

Solution to Problem

An electrode according to a first aspect of the present invention is an electrode formed on a base material including a ceramics, including:

a matrix including an Ni—Cr alloy (with a Cr content of 20 to 60 wt. %) or an MCrAlY alloy (M is at least one material selected from Fe, Co and Ni); and a disperse phase dispersed in the matrix, the disperse phase including an oxide mineral having a laminated structure, in which a ratio of area occupied by the disperse phase in a cross section of the electrode is 40 to 80%.

With the structure like this, it is possible to suppress the increase in the electrical resistance even after a thermal cycle is performed.

An electrode according to a second aspect of the present invention is the electrode described in the above-described first aspect, in which the oxide mineral is at least one of bentonite and mica. With this feature, the increase in the electrical resistance is reliably suppressed even after a thermal cycle is performed.

An electrode according to a third aspect of the present invention is the electrode described in the above-described first or second aspect, in which the electrode is formed by thermal spraying in a non-oxidative atmosphere. With this feature, the increase in the electrical resistance is suppressed more reliably even after a thermal cycle is performed.

An electrode according to a fourth aspect of the present invention is the electrode described in any one of the above-described first to third aspects, in which the ceramics includes SiC. A preferable ceramics is SiC.

An electrically heating type catalyst device according to a fifth aspect of the present invention includes:

a catalyst support including a ceramics, on which a catalyst is supported; and a pair of electrodes formed on the catalyst support, in which the electrode includes:

- a matrix including an Ni—Cr alloy (with a Cr content of 20 to 60 wt. %) or an MCrAlY alloy (M is at least one material selected from Fe, Co and Ni); and
- a disperse phase dispersed in the matrix, the disperse phase including an oxide mineral having a laminated structure, and a ratio of area occupied by the disperse phase in a cross section of the electrode is 40 to 80%.

With the structure like this, it is possible to suppress the increase in the electrical resistance even after a thermal cycle is performed.

An electrically heating type catalyst device according to a sixth aspect of the present invention is the electrically heating type catalyst device described in the above-described fifth aspect, in which the oxide mineral is at least one of bentonite and mica. With this feature, the increase in the electrical resistance is reliably suppressed even after a thermal cycle is performed.

An electrically heating type catalyst device according to a seventh aspect of the present invention is the electrically heating type catalyst device described in the above-described fifth or sixth aspect, in which the electrode is formed by thermal spraying in a non-oxidative atmosphere. With this feature, the increase in the electrical resistance is suppressed more reliably even after a thermal cycle is performed.

An electrically heating type catalyst device according to an eighth aspect of the present invention is the electrically heating type catalyst device described in any one of the above-described fifth to seventh aspects, in which the ceramics includes SiC. A preferable ceramics is SiC.

A method of manufacturing an electrically heating type catalyst device according to a ninth aspect of the present invention includes:

a step of producing a particle of a matrix including an Ni—Cr alloy (with a Cr content of 20 to 60 wt. %) or an MCrAlY alloy (M is at least one material selected from Fe, Co and Ni);

a step of producing a particle of a disperse phase including an oxide mineral having a laminated structure;

a step of forming a composite of the particle of the matrix and the particle of disperse phase and thereby producing a particle for thermal spraying; and a step of thermal-spraying the particle for thermal spraying on a catalyst support and thereby forming a pair of electrodes, the catalyst support including a ceramics, on which a catalyst is supported, in which a ratio of area occupied by the disperse phase in a cross section of the electrode is 40 to 80%.

With the structure like this, it is possible to suppress the increase in the electrical resistance even after a thermal cycle is performed.

A method of manufacturing an electrically heating type catalyst device according to a tenth aspect of the present invention is the method of manufacturing an electrically heating type catalyst device described in the above-described ninth aspect, in which the oxide mineral is at least one of bentonite and mica. With this feature, the increase in the electrical resistance is reliably suppressed even after a thermal cycle is performed.

A method of manufacturing an electrically heating type catalyst device according to an eleventh aspect of the present invention is the method of manufacturing an electrically heating type catalyst device described in the above-described tenth aspect, in which in the step of producing a particle of the disperse phase, the produced particle of the disperse phase is sintered. It is preferable to sinter the particle of the disperse phase composed of bentonite and/or mica in order to remove moisture from the particle.

A method of manufacturing an electrically heating type catalyst device according to a twelfth aspect of the present invention is the method of manufacturing an electrically heating type catalyst device described in the above-described eleventh aspect, in which in the step of producing the particle for thermal spraying, the produced particle for thermal spraying is sintered. It is preferable to sinter the particle of the disperse phase composed of bentonite and/or mica in order to remove moisture from the particle.

A method of manufacturing an electrically heating type catalyst device according to a thirteenth aspect of the present invention is the method of manufacturing an electrically heating type catalyst device described in any one of the above-described ninth to twelfth aspects, in which in the step of producing a particle of the matrix, an average particle diameter of the particle of the matrix is 10 to 50 μm. In this way, it is possible to effectively suppress the oxidation of the matrix in the thermal spraying step.

A method of manufacturing an electrically heating type catalyst device according to a fourteenth aspect of the present invention is the method of manufacturing an electrically heating type catalyst device described in any one of the above-described ninth to thirteenth aspects, in which the particle for thermal spraying is thermal-sprayed in a non-oxidative atmosphere. In this way, it is possible to effectively suppress the oxidation of the matrix in the thermal spraying step.

A method of manufacturing an electrically heating type catalyst device according to a fifteenth aspect of the present invention is the method of manufacturing an electrically heating type catalyst device described in the above-described fourteenth aspect, in which the particle for thermal spraying is plasma-sprayed in the non-oxidative atmosphere in which a flame is shielded by an Ar gas. In this way, it is possible to effectively suppress the oxidation of the matrix in the thermal spraying step.

A method of manufacturing an electrically heating type catalyst device according to a sixteenth aspect of the present invention is the method of manufacturing an electrically heating type catalyst device described in the above-described fourteenth aspect, in which the particle for thermal spraying is plasma-sprayed in the non-oxidative atmosphere that is produced by reducing a pressure. In this way, it is possible to effectively suppress the oxidation of the matrix in the thermal spraying step.

A method of manufacturing an electrically heating type catalyst device according to a seventeenth aspect of the present invention is the method of manufacturing an electrically heating type catalyst device described in the above-described fourteenth aspect, in which the particle for thermal spraying is flame-sprayed in the non-oxidative atmosphere that is a reduction atmosphere produced by raising an acetylene gas ratio in a mixed gas of oxygen and acetylene. In this way, it is possible to effectively suppress the oxidation of the matrix in the thermal spraying step.

A method of manufacturing an electrically heating type catalyst device according to an eighteenth aspect of the present invention is the method of manufacturing an electrically heating type catalyst device described in any one of the above-described ninth to seventeenth aspects, in which the ceramics includes SiC. A preferable ceramics is SiC.

Advantageous Effects of Invention

According to the present invention, it is possible to provide an electrode capable of minimizing the increase in the electrical resistance even after a thermal cycle is performed.

BRIEF DESCRIPTION OF DRAWINGS

FIG. 15 is a list of examples according to the present invention and comparative examples.

DESCRIPTION OF EMBODIMENTS

Specific exemplary embodiments to which the present invention is applied are explained hereinafter in detail with reference to the drawings. However, the present invention is not limited to the exemplary embodiments shown below. Further, for clarifying the explanation, the following descriptions and the drawings are simplified as appropriate.

(First Exemplary Embodiment)

Figure 1:
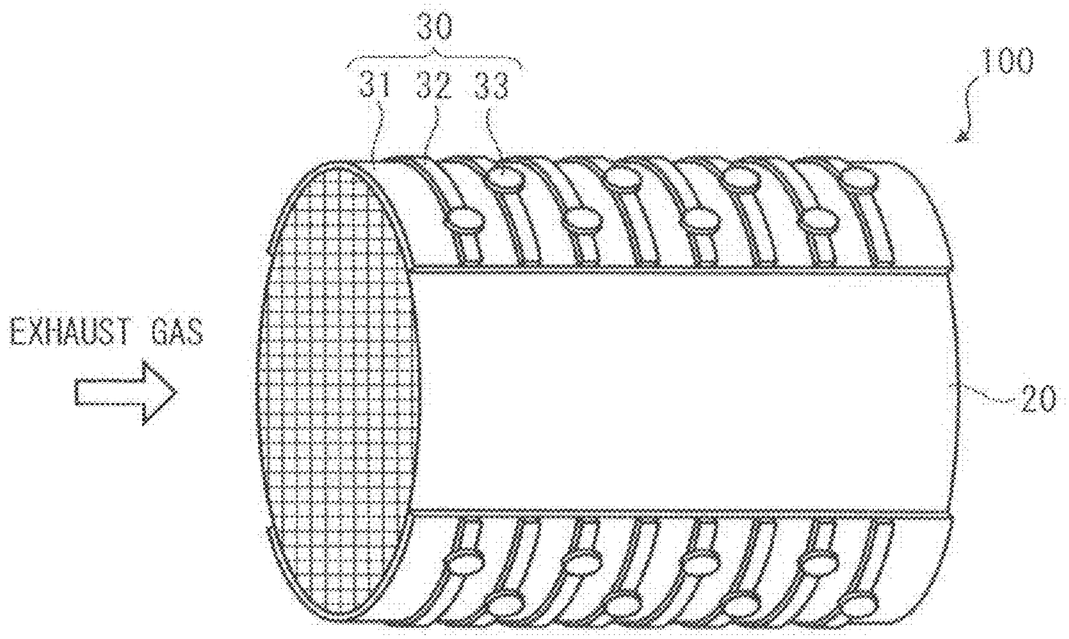
FIG. 1 is a perspective view of an electrically heating catalyst device 100 according to a first exemplary embodiment.

Firstly, an electrically heating catalyst device according to this exemplary embodiment is explained with reference to FIGS. 1 and 2. FIG. 1 is a perspective view of an electrically heating catalyst device 100 according to a first exemplary embodiment. The electrically heating catalyst device 100 is provided, for example, on a discharge path of an automobile or the like, and purifies an exhaust gas discharged from the engine. As shown in FIG. 1, the electrically heating catalyst device 100 includes a catalyst support 20 and electrodes 30.

The catalyst support 20 is a porous member on which a catalyst such as platinum and palladium is supported. Further, since the catalyst support 20 itself is electrically heated, the catalyst support 20 is composed of a conductive ceramics, for example, SiC (silicon carbide). As shown in FIG. 1, the catalyst support 20 has a cylindrical external shape and has a honeycomb structure inside thereof. As indicated by an arrow, an exhaust gas passes through the catalyst support 20 in the axial direction of the catalyst support 20.

The electrodes 30 are a pair of electrodes that are used to feed an electric current through the catalyst support 20 and thereby to heat the catalyst support 20. The electrodes 30 are disposed opposite to each other on the outer surface of the catalyst support 20. Further, each electrode 30 extends from one end to the other end of the catalyst support 20 in the longitudinal direction. A terminal (not shown) is provided in each electrode 30 so that electric power can be supplied from a power supply such as a battery. Note that one of the electrodes 30 serves as a positive pole and the other electrode 30 serves as a negative pole. However, either one of the electrodes 30 can serve as a positive pole or a negative pole. That is, there is no restriction on the direction of the current flowing through the catalyst support 20.

As shown in FIG. 1, each electrode 30 includes a base layer 31, metal foils 32, and fixing layers 33. Further, FIG. 2 is a cross-section at a part where a fixing layer 33 is formed.

As shown in FIG. 1, the base layer 31 is a thermal-sprayed film formed over the entire formation area of the electrode 30 on the outer surface of the catalyst support 20. That is, the base layers 31 are disposed opposite to each other on the outer surface of the catalyst support 20, and extend from one end to the other end of the catalyst support 20 in the longitudinal direction. As shown in FIG. 2, the base layer 31 is physically in contact with the catalyst support 20 and electrically connected to the catalyst support 20.

Figure 2:
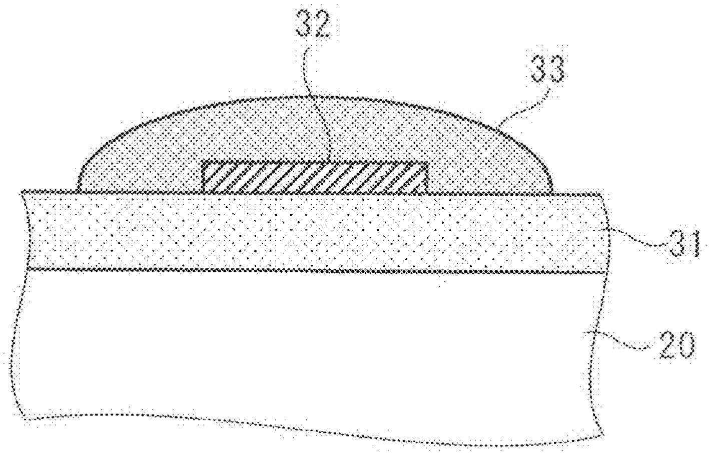
FIG. 2 is a cross section at a part where a fixing layer 33 is formed.

As shown in FIG. 2, the metal foils 32 are disposed on the base layer 31, and are physically in contact with and electrically connected to the base layer 31. Further, as shown in FIG. 1, the metal foils 32 extend in the circumferential direction over the entire formation area of the base layer 31. Further, on each base layer 31, a plurality of metal foils 32 are arranged at regular intervals along the axial direction of the catalyst support 20. In the example shown in FIG. 1, eight metal foils 32 are disposed on each base layer 31. Needless to say, the number of the metal foils 32 is not limited to eight and can be arbitrarily determined. Each metal foil 32 is, for example, a thin plate made of a metal such as an Fe—Cr alloy.

The fixing layer 33 is a button-shaped thermal-sprayed film that is formed so as to cover the metal foil 32 in order to fix the metal foil 32 to the base layer 31. Note that the fixing layer 33 is formed in the button-shape in order to alleviate the stress that is caused by the difference between the linear expansion coefficient of the fixing layer 33 and the base layer 31, which are thermal-sprayed metal-based films, and the linear expansion coefficient of the catalyst support 20, which is made of a ceramics. That is, by reducing the size of the fixing layer 33 as much as possible, the above-described stress is alleviated. As shown in FIG. 2, the fixing layers 33 are physically in contact with and electrically connected to the metal films 32 and the base layer 31. Further, as shown in FIG. 1, a plurality of fixing layers 33 are arranged at predetermined intervals in one metal foil 32 in the longitudinal direction of the metal foil 32 (axial direction of the catalyst support 20). Further, the fixing layers 33 are arranged in such a manner that the positions of the fixing layers 33 in the longitudinal direction of the metal foils 32 are different between mutually-neighboring metal foils 32.

With the above-described structure, in the electrically heating catalyst device 100, the catalyst support 20 is electrically heated between the pair of electrodes 30 and the catalyst supported on the catalyst support 20 is thereby activated. In this way, toxic substances such as unburned HC (hydrocarbon), CO (carbon monoxide), and NOx (nitrogen oxide) in an exhaust gas that passes through the catalyst support 20 are removed by the catalytic reaction.

In the electrically heating catalyst device 100 according to this exemplary embodiment, the base layer 31 and the fixing layers 33, which are thermal-sprayed films, have a characteristic feature. In order to feed electricity to the metal foils 32, the matrix, which is a thermal-sprayed film, needs to be made of a metal. Since the matrix needs to be robust enough for use at a high temperature, a preferable metal that is used to form the matrix, which is a thermal-sprayed film, is a metal having excellent acid resistance at a high temperature such as an Ni—Cr alloy (with a Cr content of 20 to 60 wt. %) and an MCrAlY alloy (M is at least one material selected from Fe, Co and Ni). Note that each of the above-described Ni—Cr alloy and the MCrAlY alloy may contain other alloy elements.

Further, the base layer 31 and the fixing layers 33, which are thermal-sprayed films, include a disperse phase in the metal matrix. The disperse phase is used to reduce the Young's modulus. It is preferable that the Young's modulus of the composite material composed of the metal matrix and the disperse phase is equal to or less than 50 GPa. For the thermal-sprayed film according to this exemplary embodiment, this disperse phase has a laminated structure and is composed of an oxide mineral containing an oxide such as $SiO_2$ and $Al_2O_3$ as the main ingredient. Specifically, the disperse phase is preferably composed of bentonite, mica, or a mixture thereof.

Figure 3:
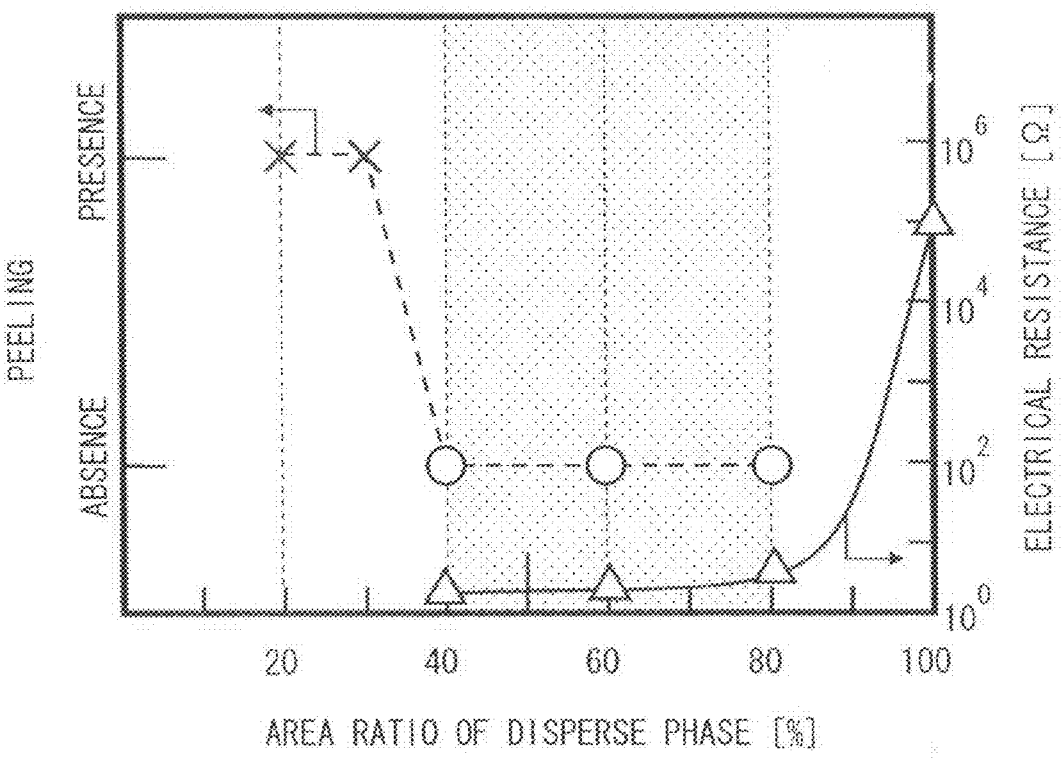
FIG. 3 is a graph showing a relation between the area ratio of a disperse phase, and the presence/absence of peeling and the electrical resistance of a thermal-sprayed film.

A preferable ratio of the disperse phase to the metal matrix is explained hereinafter with reference to FIG. 3. FIG. 3 is a graph showing a relation between the area ratio of the disperse phase, and the presence/absence of peeling and the electrical resistance of the thermal-sprayed film. Note that the catalyst support is composed of SiC. The metal matrix is composed of Ni-50 wt. % Cr. Further, the disperse phase is composed of bentonite. The horizontal axis indicates the area ratio (%) of the disperse phase. The left-side vertical axis indicates the presence/absence of peeling of the thermal-sprayed film. Further, the right-side vertical axis indicates the electrical resistance of the thermal-sprayed film. The electrical resistance is expressed in a logarithm scale. Further, in FIG. 3, data points for the presence/absence of peeling are plotted by using a mark "x" (peeling-present) and a mark "o" (peeling-absent), and the marks are connected by a broken line. Meanwhile, data points for the electrical resistance are plotted by using a mark "Δ", and the marks are connected by a solid line. The electrical resistance of the thermal-sprayed film was measured at measurement intervals of 10 mm by using a tester. Further, the area ratio of the disperse phase in the cross-sectional structure of the thermal-sprayed film (base layer 31 and fixing layer 33) can be easily obtained from a photograph of the cross-sectional structure.

As shown in FIG. 3, when the area ratio of the disperse phase is less than 40%, the effect for alleviating the stress is not sufficient. Therefore, peeling of the thermal-sprayed film from the catalyst support was observed. On the other hand, when the area ratio of the disperse phase exceeds 80%, the electrical resistance of the thermal-sprayed film increases sharply. Based on this result, the area ratio of the disperse phase is preferably 40 to 80%, and more preferably 50 to 70% as measured in the cross-sectional structure. A similar result was also obtained for a case where the disperse phase was mica.

The material that is used to form the disperse phase needs to have a laminated structure in order to alleviate the stress caused by the above-described linear expansion coefficient difference. In view of this point, graphite, $MoS_2$ (molybdenum disulfide), $WS_2$ (tungsten disulfide), and h-BN (hexagonal boron nitride), all of which are known as a solid lubricant, could be also considered to be a candidate for the material used to form the disperse phase because they have a laminated structure.

Figure 4:
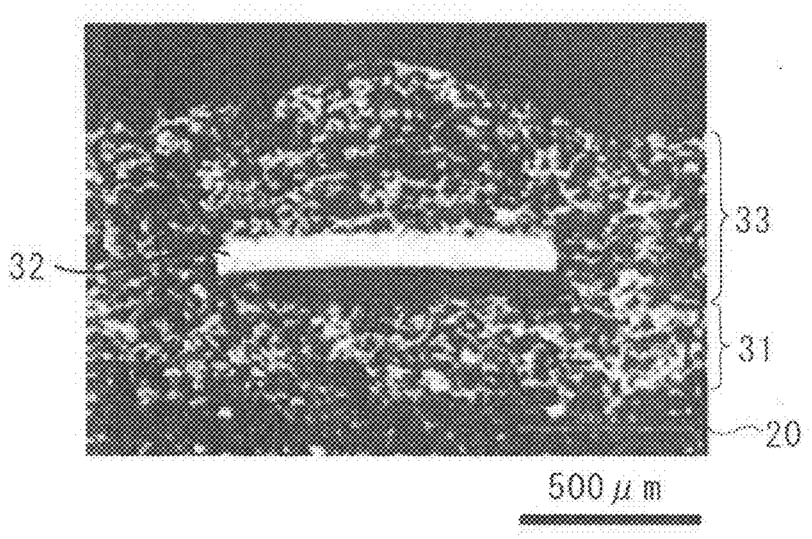
FIG. 4 is a photograph of a cross-sectional structure of a comparative example in which graphite is used as a disperse phase.

A comparative example in which graphite is used as the disperse phase is explained hereinafter with reference to FIG. 4. FIG. 4 is a photograph of a cross-sectional structure of a comparative example in which graphite is used as the disperse phase. As explained above with reference to FIGS. 1 and 2, a base layer 31 having a thickness of 200 μm and a fixing layer 33 having a thickness of 400 μm were successively formed on a catalyst support 20 composed of SiC. Further, a metal foil 32 is sandwiched between the base layer 31 and the fixing layer 33. In the thermal-sprayed film (base layer 31 and fixing layer 33) shown in FIG. 4, the white area is the metal matrix composed of an Ni-50 wt. % Cr (hereinafter also referred to as "Ni-50Cr") alloy and the black area is the disperse phase composed of graphite. FIG. 4 shows an initial state of the thermal-sprayed film before any thermal cycle is performed and its electrical resistance was 0.1Ω.

Figure 5:
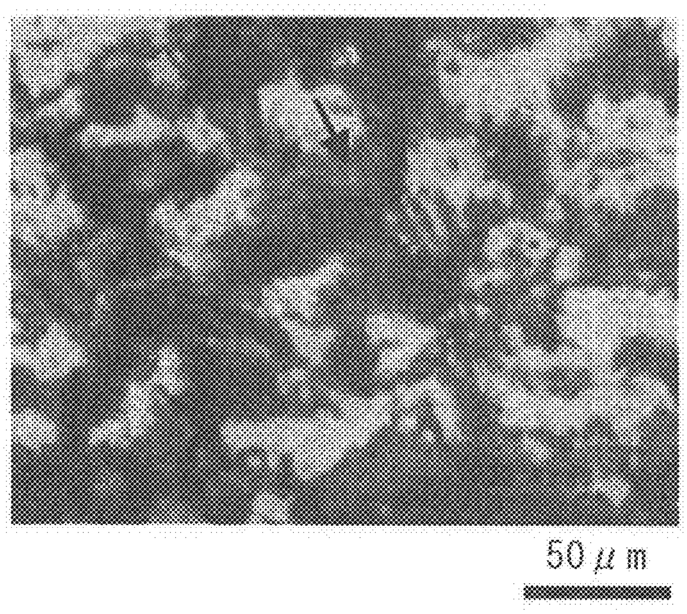
FIG. 5 is a photograph of a structure of a thermal-sprayed film according to a comparative example, taken after a thermal cycle is performed.

FIG. 5 is a photograph of a structure of the sprayed film according to the comparative example, taken after thermal cycles are performed. Specifically, thermal cycles from a room temperature to 800° C. were performed 2000 times. The electrical resistance of the thermal-sprayed film had increased significantly to about 500Ω after the thermal cycles were performed. As indicated by an arrow in FIG. 5, a gray oxide was observed in the metal matrix. That is, the oxidation of the metal matrix had advanced.

Figure 6:
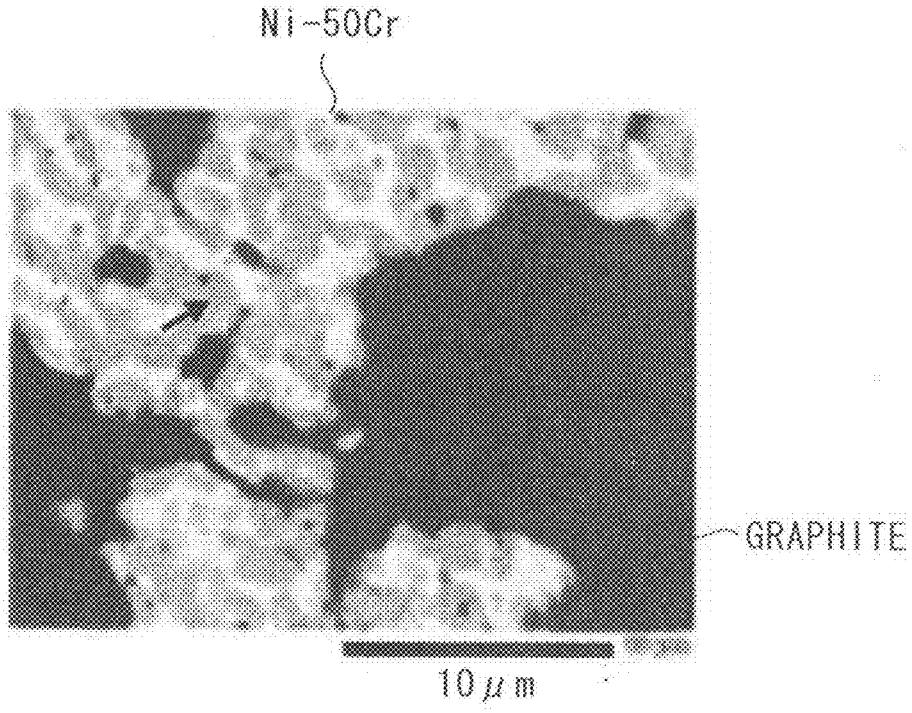
FIG. 6 is an enlarged photograph of a structure of a thermal-sprayed film according to a comparative example, taken after a thermal cycle is performed.

Accordingly, the inventor has examined why the oxidation of the metal matrix had advanced. FIG. 6 is an enlarged photograph of a structure of the sprayed film according to the comparative example, taken after the thermal cycle is performed. As indicated by an arrow in FIG. 6, a lot of gray Cr carbide pieces were observed in the white metal matrix (Ni-50Cr). When the carbonization of Cr advances in the metal matrix as described above, the amount of the metal Cr, which gives the acid resistance, decreases. As a result, the acid resistance is lowered. It is believed that as a result of the lowered acid resistance, the oxidation of the metal matrix had advanced. The probable period during which the Cr carbide is produced includes when particles for thermal spraying are produced, when thermal spraying is performed, and when a thermal cycle is performed. As described above, it has been found out that the use of graphite as the disperse phase is undesirable because graphite reacts with the metal matrix, in particular, with Cr at a high temperature.

Further, it has been found out that $MoS_2$, $WS_2$, and h-BN are decomposed and/or react with the metal matrix at a high temperature and therefore they are not an appropriate material used to form the disperse phase. By generalization, since carbide-based, sulfide-based, and nitride-based materials react with the metal matrix at a high temperature, they are not an appropriate material. In contrast to this, an oxide-based material composed of an oxide ($SiO_2$ and $Al_2O_3$) that is more stable than the Cr oxide at a high temperature does not react with the metal matrix even at a high temperature. Therefore, it is a preferable material. Specifically, a preferable material is a mineral that has a laminated structure and contains $SiO_2$ or $Al_2O_3$ as the main ingredient, such as bentonite and mica.

Next, a method of forming a thermal-sprayed film is explained.

Firstly, matrix particles having a small specific surface, composed of an Ni—Cr alloy (with a Cr content of 20 to 60 wt. %) or an MCrAlY alloy (M is at least one material selected from Fe, Co and Ni), which is used to form the metal matrix, are produced by using a gas atomizing method or the like. The average particle diameter of the matrix particles is preferably 10 to 50 μm, and more preferably 20 to 40 μm. Further, it is preferable that the matrix particles do not contain fine particles whose diameter is less than 5 μm. To suppress the oxidation during the thermal-spaying process, it is desirable that the particle diameter is large. On the other hand, to uniformly disperse the disperse phase in the thermal-sprayed film, it is desirable that the particle diameter is small.

Meanwhile, roughly spherical disperse-phase particles composed of bentonite or mica, which is used to form the disperse phase, are produced by using a spay-dry method or the like. The average particle diameter of the disperse-phase particles is preferably 10 to 50 μm, and more preferably 20 to 40 μm. Note that bentonite has such a property that it absorbs moisture and thereby swells, and mica contains crystalline water. Therefore, these particles are sintered at a temperature of 1000 to 1100° C. in a hydrogen atmosphere and the moisture contained in the disperse-phase particles is thereby removed.

Next, the matrix particles and the disperse-phase particles are formed a composite by using a kneading particle-producing method while using a polymer adhesive as a medium. After that, the composite particles are sintered again at a temperature of 1000 to 1100° C. in a hydrogen atmosphere. As a result, particles for thermal spraying were produced. The average particle diameter of the particles for thermal spraying is preferably 30 to 150 μm.

Figure 7:
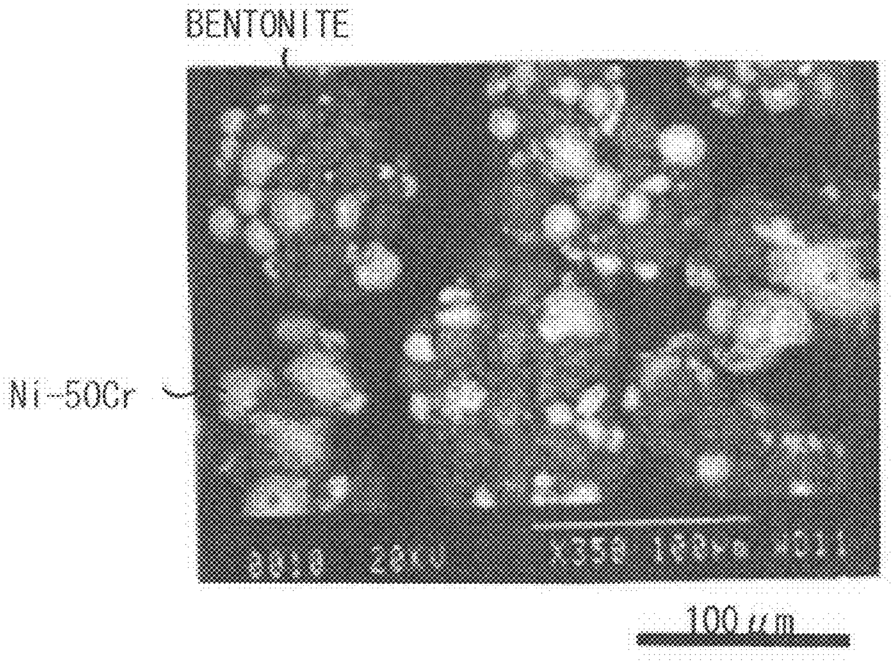
FIG. 7 is a photomicrograph of particles for thermal spraying that are used to form a thermal-spayed film according to a first exemplary embodiment.

FIG. 7 is a photomicrograph of particles for thermal spraying that are used to form a thermal-spayed film according to the first exemplary embodiment. In this picture, the white particles are the matrix (Ni-50Cr) particles, and the black particles are the disperse-phase (bentonite) particles. The particle diameters of the matrix particles and the disperse-phase particles are both 10 to 50 μm (average particle diameter 30 μm).

Next, the above-described disperse-phase particles are plasma-sprayed on the surface of a catalyst support 20 composed of SiC and a base layer 31 having a thickness of 100 to 200 μm is thereby formed.

Next, a metal foil 32 having a thickness of 100 μm and a width of 1 mm is disposed on the base layer 31. A button-shaped fixing layer 33 having a thickness of 300 to 500 μm is formed on this metal foil 32 by plasma spraying using a masking jig.

Although the plasma spraying can be carried out in an atmospheric atmosphere, it is preferable that the plasma spraying is carried out in a non-oxidative atmosphere. Specifically, it is possible to suppress the oxidation during the thermal-spraying process of a thermal-sprayed film by carrying out plasma spraying with a plasma flame shield generated by an inert gas such as Ar, and/or in a reduced-pressure atmosphere. Further, instead of the plasma spraying, flame spraying using an oxygen-acetylene combustion flame may be carried out. The flame spraying may be carried out in a reduction atmosphere that is created by bringing the combustion flame into an acetylene-rich state.

Next, the reason why the particles for thermal spraying having an average particle diameter of 30 to 150 μm is produced by forming a composite of the matrix particles and the disperse-phase particles as explained above with reference to FIG. 7 is explained.

Figure 8:
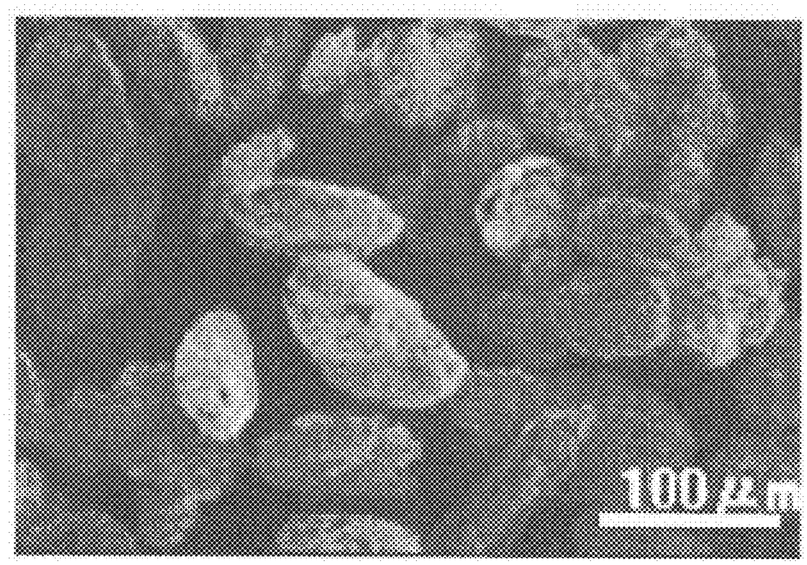
FIG. 8 is a photomicrograph of particles for thermal spraying of a comparative example in which graphite is used as a disperse phase.
Figure 9:
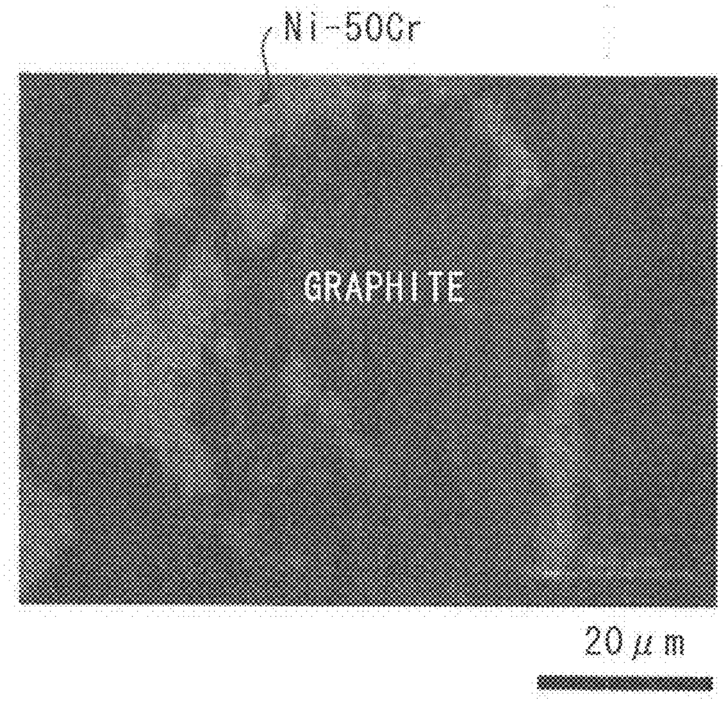
FIG. 9 is a cross-sectional photomicrograph of particles for thermal spraying of a comparative example.

FIG. 8 is a photomicrograph of particles for thermal spraying of a comparative example in which graphite is used as the disperse phase. FIG. 9 is a cross-sectional photomicrograph of particles for thermal spraying of the comparative example. As shown in FIG. 9, the particles for thermal spraying of the comparative example were produced by sticking fine matrix (Ni-50Cr) particles, which were crushed into flakes smaller than 5 μm in advance, on the surface of graphite particles (cladding). The fine matrix particles are produced by crushing matrix particles produced by a gas atomizing method into fine particles.

Figure 10:
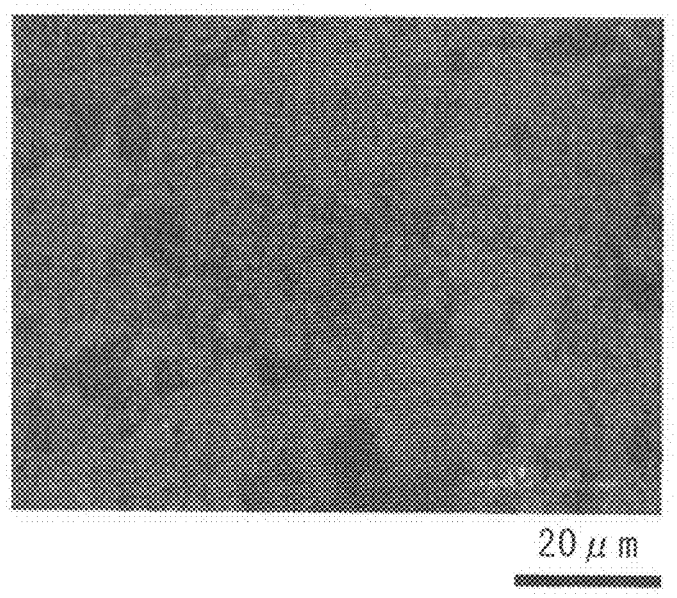
FIG. 10 is a photomicrograph of a matrix in a thermal-sprayed film according to a comparative example.

It has been found out that when the matrix (Ni-50Cr) is crushed into a fine powder as in the case of the comparative example shown in FIGS. 8 and 9, the oxidation of Cr contained in the matrix advances before thermal cycles are performed, i.e., during the thermal-spraying process. FIG. 10 is a photomicrograph of a matrix in a thermal-sprayed film according to the comparative example. As shown in FIG. 10, a lot of crater-like Cr oxide pieces were observed in the thermal-sprayed film.

When the oxidation of Cr in the matrix advances during the thermal-spraying process as described above, the Cr concentration in the matrix relatively decreases. That is, since the concentration of Cr, which gives the acid resistance, decreases in the matrix, the oxidation of the matrix tends to advance more easily during the thermal cycles, thus causing a problem that the electrical resistance increases. It is surmised that this is caused because, as a result of the pulverization of the matrix (Ni-50Cr), the specific surface increases and the oxidation is thereby accelerated during the thermal-spraying process.

Therefore, according to this exemplary embodiment, as described above, matrix particles produced by a gas atomizing method are used as they are as the particles for thermal spraying without crushing them into fine particles. In this way, it is possible not only to suppress the oxidation of the matrix, but also to reduce the number of the manufacturing process steps.

Figure 11:
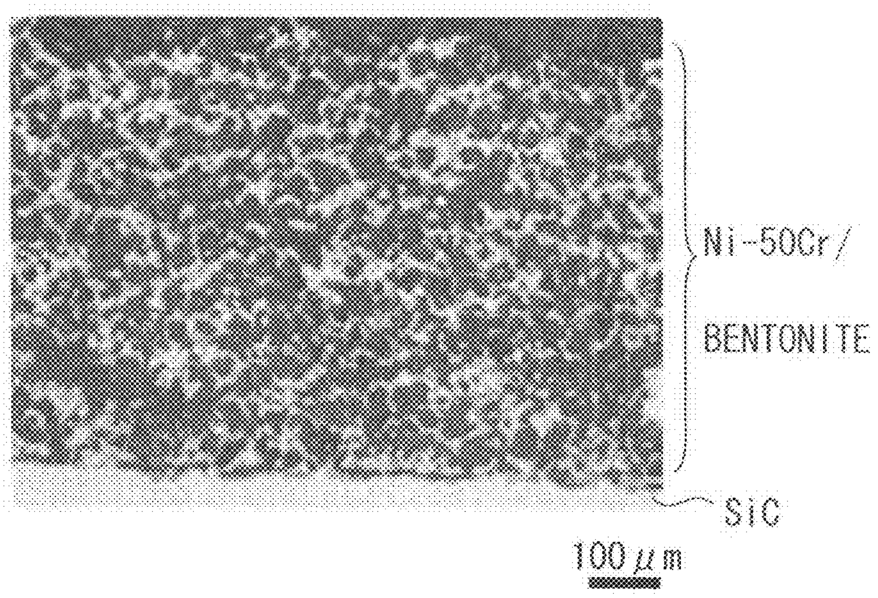
FIG. 11 is a photograph of a cross-sectional structure of a thermal-sprayed film according to this exemplary embodiment.

Further, it has been also found out that when the matrix particles and the disperse-phase particles are simply mixed, the disperse phase is not uniquely dispersed in the generated thermal-sprayed film due to the difference of their specific gravities. Therefore, as explained above with reference to FIG. 7, the particles for thermal spraying are produced by forming a composite of matrix particles and the disperse-phase particles. In this way, it becomes possible to uniquely disperse the disperse phase in the generated thermal-sprayed film. FIG. 11 is a photograph of a cross-sectional structure of a thermal-sprayed film according to this exemplary embodiment. As shown in FIG. 11, the disperse phase (bentonite) is dispersed highly uniquely in the matrix (Ni-50Cr) in the thermal-sprayed film. Note that the thermal-sprayed film shown in FIG. 11 was obtained by carrying out thermal spraying on a catalyst support composed of SiC in an atmospheric atmosphere.

Figure 12A:
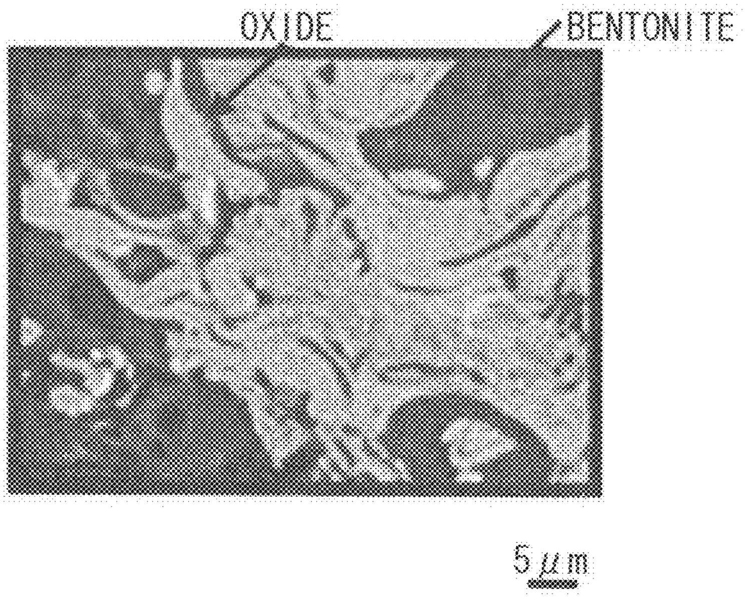
FIG. 12A is a photograph of a structure of a thermal-sprayed film formed by atmospheric plasma spraying.
Figure 12B:
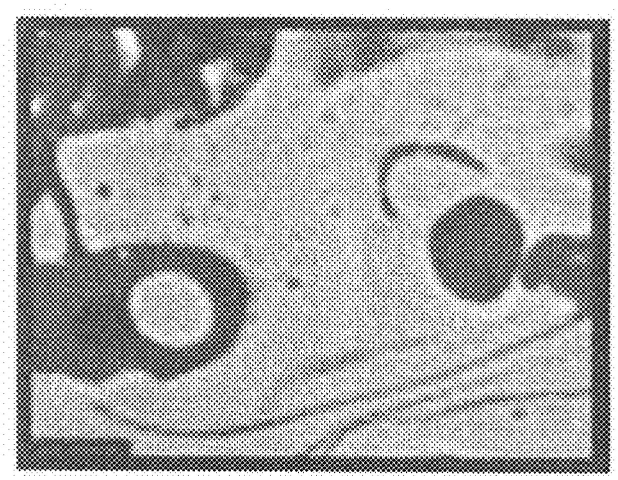
FIG. 12B is a photograph of a structure of a thermal-sprayed film formed by Ar-shield plasma spraying.
Figure 12C:
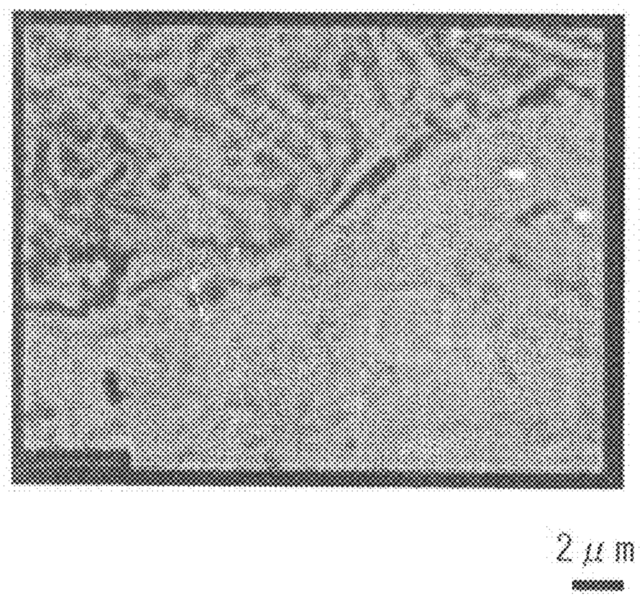
FIG. 12C is a photograph of a structure of a thermal-sprayed film formed by reduced-pressure plasma spraying.

Next, examination results of thermal-spraying atmospheres are explained with reference to FIGS. 12A to 12C. In order to prevent the oxidation of Cr in the matrix (Ni-50Cr) during the thermal-spraying process, we have examined Ar-shield plasma spraying and reduced-pressure plasma spraying at a pressure of 10 Pa. Note that for all of the thermal-sprayed films, the disperse phase is composed of bentonite and its area ratio is 60%. FIG. 12A is a photograph of a structure of a thermal-sprayed film formed by atmospheric plasma spraying. FIG. 12B is a photograph of a structure of a thermal-sprayed film formed by Ar-shield plasma spraying. FIG. 12C is a photograph of a structure of a thermal-sprayed film formed by reduced-pressure plasma spraying.

As indicated by an arrow in FIG. 12A, a Cr oxide was observed in the thermal-sprayed film obtained by the atmospheric plasma spraying. In contrast to this, the amount of the Cr oxide is smaller in the thermal-sprayed films shown in FIGS. 12B and 12C than that in the thermal-sprayed film shown in FIG. 12A. Further, in the thermal-sprayed film shown in FIG. 12A, an increase in the electrical resistance was observed after thermal cycles (100 to 900° C., 2000 cycles) were performed. In contrast to this, in the thermal-sprayed films shown in FIGS. 12B and 12C, no increase in the electrical resistance was observed even after the same thermal cycles were performed. That is, it is believed that the oxidation of Cr during the thermal-spraying process was suppressed and its acid resistance was sufficiently exerted. Further, it has been found out that the oxygen concentration in the thermal-spraying flame area needs to be equal to or less than 0.2 vol. % in order to achieve a sufficient oxidation suppression effect.

Figure 13:
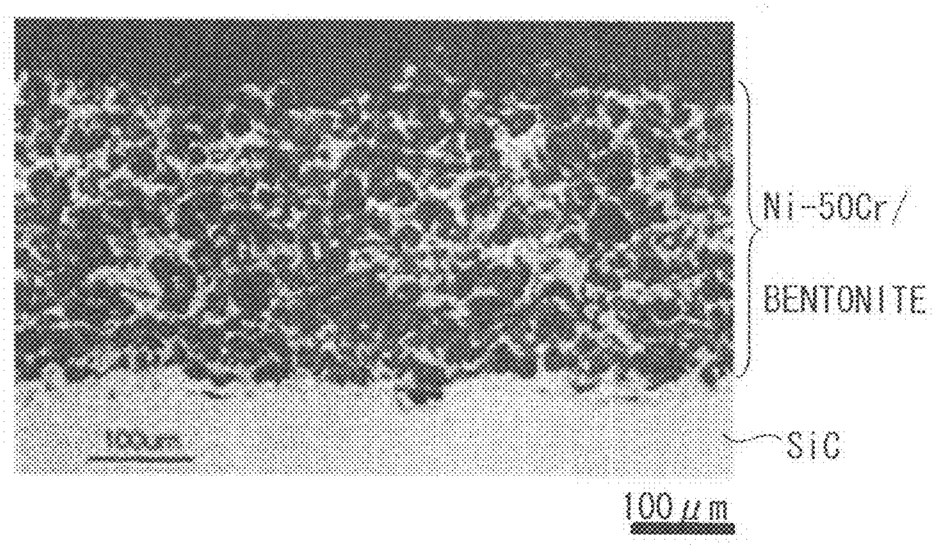
FIG. 13 is a photograph of a cross-sectional structure of a thermal-sprayed film formed on an SiC catalyst support by Ar-shield thermal spraying (before a thermal cycle is performed)
Figure 14:
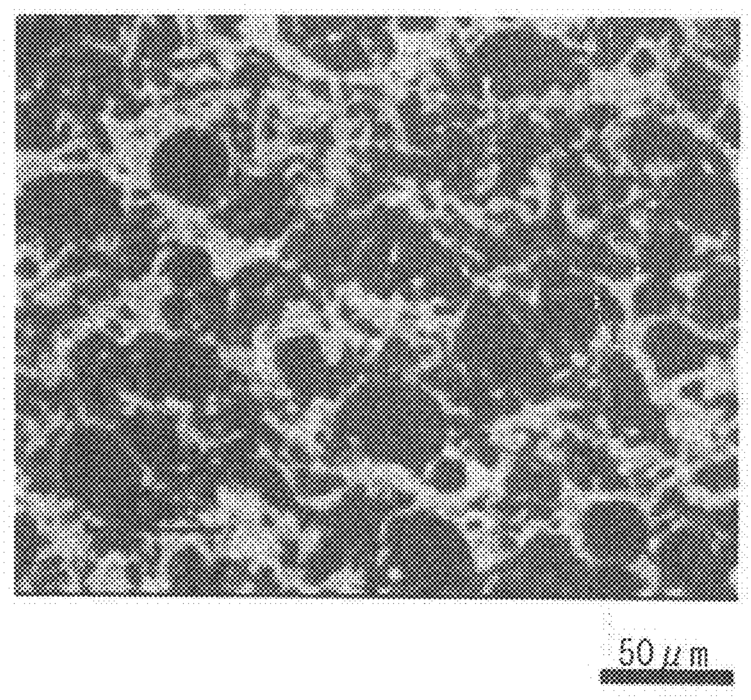
FIG. 14 is a photograph of a cross-sectional structure of a thermal-sprayed film shown in FIG. 13, taken after a thermal cycle is performed.

FIG. 13 is a photograph of a cross-sectional structure of a thermal-sprayed film formed on an SiC catalyst support by Ar-shield thermal spraying (before the thermal cycles are performed). The matrix is composed of Ni-50Cr, and the disperse phase is composed of bentonite. FIG. 14 is a photograph of a cross-sectional structure of a thermal-sprayed film shown in FIG. 13, taken after thermal cycles (100 to 900° C., 2000 cycles) are performed. As shown in FIG. 14, the oxidation of the matrix had not advanced even after the thermal cycles were performed.

Further, as an alternative method to the above-described Ar-shield thermal spaying or the reduced pressure thermal spraying in the plasma spraying, thermal spraying may be carried out, in flame spraying using an oxygen-acetylene combustion flame, in a reduction atmosphere that is created by bringing the combustion flame into an acetylene-rich state. To implement the Ar-shield plasma spaying or the reduced pressure plasma spraying, it is necessary to make some change to the atmospheric plasma spraying equipment. In contrast to this, the above-described flame spraying has an advantage that it requires a small change.

Further, in order to suppress the oxidation of the matrix during the thermal-spraying process, an active metal such as Al, Ti and Mg may be stuck on the surface of the above-described matrix by using cladding or other methods. Since the active metal is preferentially oxidized during the thermal-spraying process, the oxidation of the matrix can be suppressed.

EXAMPLES

Specific examples according to the present invention are explained hereinafter. However, the present invention is not limited to these examples. FIG. 15 is a list of examples according to the present invention and comparative examples.

Example 1

Matrix particles having a particle diameter of 10 to 50 μm (average particle diameter 30 μm), composed of Ni-50 wt. % Cr alloy, which was used to form the metal matrix, were produced by using a gas atomizing method.

Meanwhile, disperse-phase particles having a particle diameter of 10 to 50 μm (average particle diameter 30 μm), composed of bentonite, which was used to form the disperse phase, were produced by using a spray-dry method. These particles were sintered at a temperature of 1050° C. in a hydrogen atmosphere.

Next, the matrix particles and the disperse-phase particles were formed a composite by using a kneading particle-producing method while using a polymer adhesive as a medium. Further, the composite particles were sintered at a temperature of 1050° C. in a hydrogen atmosphere. As a result, particles for thermal spraying were produced.

Next, the above-described disperse-phase particles were plasma-sprayed on the surface of a catalyst support 20 composed of SiC and a base layer 31 having a thickness of 150 μm was thereby formed.

Next, a metal foil 32 having a thickness of 100 μm and a width of 1 mm was disposed on the base layer 31. Further, a fixing layer 33 having a thickness of 400 μm was formed on the metal foil 32 by plasma spraying using a masking jig.

A Metco F4 gun was used as the plasma-spraying apparatus. As for the plasma gas, an Ar—$H_2$ mixed gas composed of an Ar gas having a flow rate of 60 L/min and an $H_2$ gas having a flow rate of 10 L/min was used. The plasma current was 600 A. The plasma voltage was 60 V. The thermal-spraying distance was 150 mm. Further, the supply rate of the particles for thermal spraying was 30 g/min. Furthermore, in order to suppress the oxidation of the matrix during the thermal-spraying process, the plasma flame was shielded by an Ar gas.

For the thermal-sprayed film (base layer 31 and fixing layer 33) according to Example 1, the area ratio of the disperse phase was adjusted to 40%. After thermal cycles (100 to 900° C., 2000 cycles) were performed, the electrical resistance was measured at measurement intervals of 10 mm by using a tester. As a result, the measured electrical resistance was 3.0Ω and was extremely excellent result.

Example 2

Figure 16:
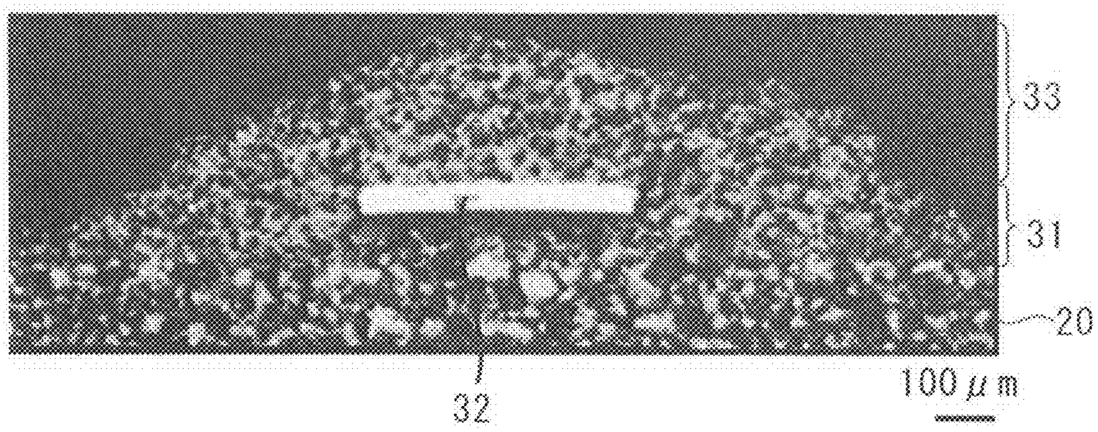
FIG. 16 is a photograph of a cross-sectional structure of a thermal-sprayed film according to Example 2.

A thermal-sprayed film was formed in the same manner as that of Example 1 except that the area ratio of the disperse phase was adjusted to 60%. As a result, the electrical resistance measured after the thermal cycles was 2.8Ω and was extremely excellent result. FIG. 16 is a photograph of a cross-sectional structure of a thermal-sprayed film according to Example 2.

Example 3

A thermal-sprayed film was formed in the same manner as that of Example 1 except that the area ratio of the disperse phase was adjusted to 80%. As a result, the electrical resistance measured after the thermal cycles was 4.0Ω and was excellent result though it was somewhat higher than those in Examples 1 and 2.

Example 4

A thermal-sprayed film was formed in the same manner as that of Example 2 except that mica was used as the material used to form the disperse phase. As a result, the electrical resistance measured after the thermal cycles was 3.1Ω and was extremely excellent result.

Example 5

A thermal-sprayed film was formed in the same manner as that of Example 2 except that a Co-25 wt. % Ni-16 wt. % Cr-6.5 wt. % Al-0.5 wt. % Y alloy was used as the material used to form the matrix. As a result, the electrical resistance measured after the thermal cycles was 3.5Ω and was excellent result.

Example 6

A thermal-sprayed film was formed in the same manner as that of Example 5 except that mica was used as the material used to form the disperse phase. As a result, the electrical resistance measured after the thermal cycles was 3.6Ω and was excellent result.

Example 7

A thermal-sprayed film was formed in the same manner as that of Example 2 except that an Ni-23 wt. % Co-20 wt. % Cr-8.5 wt.% Al-0.6 wt. % Y alloy was used as the material used to form the matrix. As a result, the electrical resistance measured after the thermal cycles was 3.5Ω and was excellent result.

Example 8

A thermal-sprayed film was formed in the same manner as that of Example 2 except that an Fe-20 wt. % Cr-6.5 wt. % Al-0.5wt. % Y alloy was used as the material used to form the matrix. As a result, the electrical resistance measured after the thermal cycles was 3.3Ω and was excellent result.

Example 9

A thermal-sprayed film was formed in the same manner as that of Example 1 except that atmospheric plasma spraying was carried out without shielding the plasma flame by an Ar gas. As a result, the electrical resistance measured after the thermal cycles was 20Ω.

Example 10

A thermal-sprayed film was formed in the same manner as that of Example 2 except that atmospheric plasma spraying was carried out without shielding the plasma flame by an Ar gas and the particle diameter of the matrix particles, which were used to produce the particles for thermal spraying, was less than 5 μm. As a result, the electrical resistance measured after the thermal cycles was 46Ω.

Comparative Example 1

A thermal-sprayed film was formed in the same manner as that of Example 10 except that graphite was used as the material used to form the disperse phase. As a result, the electrical resistance measured after the thermal cycles was 490Ω and was an extremely high value. It is believed that, as explained above with reference to FIG. 6, since graphite was used as the material used to form the disperse phase, it could not produce an excellent result.

Comparative Example 2

A thermal-sprayed film was formed in the same manner as that of Example 2 except that atmospheric plasma spraying was carried out without shielding the plasma flame by an Ar gas and graphite was used as the material used to form the disperse phase. As a result, the electrical resistance measured after the thermal cycles was 310Ω and was an extremely high value. It is believed that, as explained above with reference to FIG. 6, since graphite was used as the material used to form the disperse phase, it could not produce an excellent result.

Comparative Example 3

A thermal-sprayed film was formed in the same manner as that of Example 2 except that graphite was used as the material used to form the disperse phase. As a result, the electrical resistance measured after the thermal cycles was 200Ω and was a high value. It is believed that, as explained above with reference to FIG. 6, since graphite was used as the material used to form the disperse phase, it could not produce an excellent result.

Comparative Example 4

A thermal-sprayed film was formed in the same manner as that of Example 9 except that the area ratio of the disperse phase was adjusted to 30%. As a result, the thermal-sprayed film was peeled from the catalyst support 20 and thus the electrical resistance could not be measured. It is believed that the area ratio of the disperse phase so small that it could not produce an excellent result.

Comparative Example 5

A thermal-sprayed film was formed in the same manner as that of Example 1 except that the area ratio of the disperse phase was adjusted to 30%. As a result, the thermal-sprayed film was peeled from the catalyst support 20 and thus the electrical resistance could not be measured. It is believed that the area ratio of the disperse phase so small that it could not produce an excellent result.

As can be seen from the results of Examples 1 to 10, excellent thermal-sprayed films having an electrical resistance equal to or smaller than 50Ω as measured after the thermal cycles were obtained by adjusting the content of the disperse phase composed of bentonite or mica to 40 to 80% as expressed in the area ratio. Further, as can be seen from the results of Examples 1 to 8, extremely excellent thermal-sprayed films having an electrical resistance equal to or smaller than 5Ω as measured after the thermal cycles were obtained by carrying out the thermal spraying in a non-oxidative atmosphere. Further, as for the matrix particles used to produce the particles for thermal spraying, the oxidation suppression during the thermal-spraying process became more effective and more excellent results were obtained when the average particle diameter was around 30 μm than when the matrix particles was crushed into a fine powder having an average particle diameter less than 5 μm.

Note that the present invention is not limited to the above-described exemplary embodiments, and various modifications can be made to the exemplary embodiments without departing from the spirit of the present invention.

REFERENCE SIGNS LIST

20 CATALYST SUPPORT
30 ELECTRODE
31 BASE LAYER
32 METAL FOIL
33 FIXING LAYER
100 ELECTRICALLY HEATING CATALYST DEVICE

The invention claimed is:

1. An electrode for an electrically heating type catalyst device, the electrode being formed on a base material comprising a ceramics, the electrode comprising:

a matrix comprising an Ni—Cr alloy (with a Cr content of 20 to 60 wt. %) or an MCrAlY alloy (M is at least one material selected from Fe, Co and Ni); and a disperse phase dispersed in the matrix, the disperse phase comprising an oxide mineral having a laminated structure, wherein a ratio of area occupied by the disperse phase in a cross section of the electrode is 40 to 80%.

2. The electrode for an electrically heating type catalyst device according to claim 1, wherein the oxide mineral is at least on of bentonite and mica.

3. The electrode for an electrically heating type catalyst device according to claim 1, wherein the electrode is formed by thermal spraying in a non-oxidative atmosphere.

4. The electrode for an electrically heating type catalyst device according to claim 1, wherein the ceramics contains SiC.

5. An electrically heating type catalyst device comprising:

a catalyst support comprising a ceramics, on which a catalyst is supported; and a pair of electrodes formed on the catalyst support, wherein the electrode comprises:

a matrix comprising an Ni—Cr alloy (with a Cr content of 20 to 60 wt. %) or an MCrAlY alloy (M is at least one material selected from Fe, Co and Ni); and a disperse phase dispersed in the matrix, the disperse phase comprising an oxide mineral having a laminated structure, and a ratio of area occupied by the disperse phase in a cross section of the electrode is 40 to 80%.

6. The electrically heating type catalyst device according to claim 5, wherein the oxide mineral is at least one of bentonite and mica.

7. The electrically heating type catalyst device according to claim 5, wherein the electrode is formed by thermal spraying in a non-oxidative atmosphere.

8. The electrically heating type catalyst device according to claim 5, wherein the ceramics contains SiC.

9. A method of manufacturing an electrically heating type catalyst device, comprising:

a step of producing a particle of a matrix comprising an Ni-Cr alloy (with a Cr content of 20 to 60 wt.%) or an MCrAlY alloy (M is at least one material selected from Fe, Co and Ni);

a step of producing a particle of a disperse phase comprising an oxide mineral having a laminated structure;

a step of forming a composite of the particle of the matrix and the particle of disperse phase and thereby producing a particle for thermal spraying; and a step of thermal-spraying the particle for thermal spraying on a catalyst support and thereby forming a pair of electrodes, the catalyst support comprising a ceramics, on which a catalyst is supported, wherein a ratio of area occupied by the disperse phase in a cross section of the electrode is 40 to 80%.

10. The method of manufacturing an electrically heating type catalyst device according to Claim 9, wherein the oxide mineral is at least one of bentonite and mica.

11. The method of manufacturing an electrically heating type catalyst device according to Claim 10, wherein in the step of producing a particle of a disperse phase, the produced particle of the disperse phase is sintered.

12. The method of manufacturing an electrically heating type catalyst device according to Claim 11, wherein in the step of producing a particle for thermal spraying, the produced particle for thermal spraying is sintered.

13. The method of manufacturing an electrically heating type catalyst device according to Claim 9, wherein in the step of producing a particle of a matrix, an average particle diameter of the particle of the matrix is 10 to 50 μm.

14. The method of manufacturing an electrically heating type catalyst device according to Claim 9, wherein in the step of forming an electrode, the particle for thermal spraying is thermal sprayed in a non-oxidative atmosphere.

15. The method of manufacturing an electrically heating type catalyst device according to Claim 14, wherein the particle for thermal spraying is plasma sprayed in the non-oxidative atmosphere in which a flame is shielded by an Ar gas.

16. The method of manufacturing an electrically heating type catalyst device according to Claim 14, wherein the particle for thermal spraying is plasma sprayed in the non-oxidative atmosphere that is produced by reducing a pressure.

17. The method of manufacturing an electrically heating type catalyst device according to Claim 14, wherein the particle for thermal spraying is flame sprayed in the non-oxidative atmosphere that is a reduction atmosphere produced by raising an acetylene gas ratio in a mixed gas of oxygen and acetylene.

18. The method of manufacturing an electrically heating type catalyst device according to Claim 9, wherein the ceramics contains SiC.

* * * * *